(12) United States Patent
Luukanen

(10) Patent No.: US 7,078,695 B2
(45) Date of Patent: Jul. 18, 2006

(54) SUPERCONDUCTING ANTENNA-COUPLED HOT-SPOT MICROBOLOMETER, METHODS FOR ITS MANUFACTURE AND USE, AND A BOLOMETRIC IMAGING ARRANGEMENT

(75) Inventor: Arttu Luukanen, Helsinki (FI)

(73) Assignee: Oxford Instruments Analytical Oy, Espoo (FI)

( * ) Notice: Subject to any disclaimer, the term of this patent is extended or adjusted under 35 U.S.C. 154(b) by 410 days.

(21) Appl. No.: 10/444,260

(22) Filed: May 23, 2003

(65) Prior Publication Data

US 2003/0222217 A1    Dec. 4, 2003

(30) Foreign Application Priority Data

Jun. 3, 2002    (FI) ................................ 20021058

(51) Int. Cl.
*H01L 27/18* (2006.01)
*H01L 39/00* (2006.01)
*G01K 7/00* (2006.01)
*G01J 5/20* (2006.01)

(52) U.S. Cl. .................... 250/336.2; 374/163; 505/161
(58) Field of Classification Search ............. 250/336.2, 250/338.1; 505/161, 201, 220, 847, 849
See application file for complete search history.

(56) References Cited

U.S. PATENT DOCUMENTS

| | | | | |
|---|---|---|---|---|
| 3,742,235 A | * | 6/1973 | Boatner et al. | ............. 250/349 |
| 5,090,819 A | | 2/1992 | Kapitulnik | |
| 5,171,733 A | * | 12/1992 | Hu | ........................... 250/336.2 |
| 5,850,098 A | * | 12/1998 | Butler et al. | ................ 257/467 |
| 6,292,140 B1 | * | 9/2001 | Osterman | ............ 343/700 MS |
| 6,310,346 B1 | * | 10/2001 | Boreman et al. | ......... 250/338.4 |
| 6,329,655 B1 | | 12/2001 | Jack et al. | |
| 2004/0140429 A1 | * | 7/2004 | Jack et al. | ................ 250/338.1 |
| 2004/0252065 A1 | * | 12/2004 | Agnese et al. | .............. 343/703 |

FOREIGN PATENT DOCUMENTS

| | | |
|---|---|---|
| EP | 0 867 702 A2 | 9/1998 |
| EP | 0 867 702 A3 | 9/1998 |
| EP | 0 903 566 A2 | 3/1999 |
| EP | 0 903 566 A3 | 3/2000 |
| WO | WO 94/05046 A2 | 3/1994 |

OTHER PUBLICATIONS

Rice et al. "High-$T_c$ Superconducting Antenna-Coupled Microbolometer on Silicon" SPIE Proceedings, The International Society for Optical Engineering U.S.A., 1994, vol. 2159, pp. 98-109, XP009041389.

(Continued)

*Primary Examiner*—David Porta
*Assistant Examiner*—Frederick F. Rosenberger
(74) *Attorney, Agent, or Firm*—Wood, Phillips, Katz, Clark & Mortimer

(57) ABSTRACT

An antenna-coupled microbolometer structure comprises a substrate (301), an antenna (102, 103) supported by the substrate, and a thermally sensitive element (101, 305) connected to the antenna and arranged to dissipate electric currents induced into the antenna. Both the antenna (102, 103) and the thermally sensitive element (101, 305) comprise material that is susceptible to achieving a superconductive state below a certain critical temperature. The thermally sensitive element (101, 305) is supported at a distance from the substrate (301) leaving an empty gap (306) between the thermally sensitive element (101, 305) and a surface of the substrate (301).

5 Claims, 4 Drawing Sheets

OTHER PUBLICATIONS

Neff et al. "Thermal Budget Calculations, Design Aspects, and Device Performance of High-TC Air-Bridged Microbolometers" IEEE Transactions on Applied Superconductivity, Sep. 1997, vol. 7, No. 3, pp. 3802-3807, XP 000698393, New York, U.S.

Luukanen et al. "Terahertz Imaging System Based on Antenna-Coupled Microbolometers" SPIE Conference, Apr. 1998, vol. 3378, pp. 34-44, XP-000892261, Bellingham, VA, U.S.

Cyrille et al. "Processing of Nb DC QUIDs for RF Amplification" Thin Solid Films, Elsevier-Sequoia S.A., Nov. 25, 1998, vol. 333, No. 1-2, pp. 228-234, XP004152120, Lausanne, CH.

Floet et al., "Hotspot mixing: A framework for heterodyne mixing in superconducting hot-electron bolometers," Applied Physics Letters, Jan. 18, 1999, vol. 74, No. 3, pp. 433-435.

Rice et al., "Antenna-coupled high-$T_c$ air-bridge microbolometer on silicon," Applied Physics Letters, Aug. 8, 1994, vol. 65, No. 6, pp. 773-775.

Grossman et al., "Lithographic spiral antennas at short wavelengths," Applied Physics Letters, Dec. 16, 1991, vo. 59, No. 25, pp. 3225-3227.

MacDonald et al., "Niobium Microbolometers for Far-Infrared Detection," IEEE: Transactions on Microwave Theory and Techniques, Apr. 4, 1995, vol. 43, No. 4, pp. 893-896.

* cited by examiner

SUPERCONDUCTING ANTENNA-COUPLED HOT-SPOT MICROBOLOMETER, METHODS FOR ITS MANUFACTURE AND USE, AND A BOLOMETRIC IMAGING ARRANGEMENT

TECHNICAL FIELD

The invention concerns generally the technology of antenna-coupled microbolometers. Especially the invention concerns an advantageous structure of an antenna-coupled microbolometer where the sensing element is made of superconducting material. Additionally the invention concerns a method for manufacturing such a microbolometer, as well as a method for using such a microbolometer for detecting electromagnetic radiation.

BACKGROUND OF THE INVENTION

A bolometer in general is a radiation detector where incoming electromagnetic radiation causes the temperature of a detector element to change in a way that can be measured and converted into an electrical output signal. Microbolometers are a special instance of bolometers with the common features that they are small in size and fabricated onto a planar semiconductor substrate using essentially the same miniature lithographic techniques that are used for manufacturing integrated circuits. An antenna-coupled microbolometer consists of a lithographically manufactured antenna that is coupled to a thermally sensitive element, which is impedance-matched to the antenna and dissipates antenna currents, thus acting as the antenna termination. If the antenna comprises two antenna branches, said thermally sensitive element is a narrow neck or isthmus that connects the antenna branches to each other. A heat bath is provided for keeping the whole antenna-coupled microbolometer in a constant temperature, so that ideally all changes of temperature in the thermally sensitive element are due to time-varying currents induced to the antenna by received electromagnetic radiation. The radiation frequencies that are to be detected with antenna-coupled microbolometers are typically between several tens of GHz and several tens of THz. Signal frequencies, i.e. the rate of change of the signal to be detected, is typically in the audio range.

A major measure of the quality of an antenna-coupled microbolometer is its Noise Equivalent Power (NEP) figure, which describes the sensitivity of the device, i.e. its ability of discriminating between an actually received signal and noise. In an ideal situation the NEP is dominated by the so-called phonon noise, which is a consequence of energy fluctuations between the thermally sensitive element and the heat bath. In order to approach such an ideal situation (the absolute value of) the responsivity of the bolometer should be large enough. This condition is difficult to reach with conventional metal bolometers, because the absolute value of the Temperature Coefficient of Resistance (TCR) is too small for metals. Semiconductors typically have a TCR the absolute value of which is larger, but then again semiconductors are difficult to match to useful antennae, which have a typical impedance of the order of 100 ohms. A widely accepted solution is to use a superconductor film, operated at the normal metal to superconductor transition, as the thermal sensing element.

A publication J. P. Rice, E. N. Grossman, D. A. Rudman: "Antenna-coupled high-$T_c$ air-bridge microbolometer on silicon", Applied Physics Letters, 65(6):773–775, 1994 is known to disclose an antenna-coupled microbolometer with a NEP=$9 \cdot 10^{-12}$ W/$\sqrt{Hz}$ at a bath temperature of 87.4 K. However, the fabrication of air-bridges of the kind shown in said publication has proven to be difficult. Additionally, making a microbolometer from a superconductor film that has a high critical temperature (so-called high-$T_c$ superconductor) usually necessitates using a buffer layer, such as YSZ (Yttria-Stabilized Zirconia), between the superconductor film and the substrate. This increases the thermal conductivity between said materials, which is a disadvantage. Additionally microbolometers made of high-$T_c$ superconductor films are known to suffer from excessive amounts of so-called 1/f noise, which may require using a separate optical chopper in front of the bolometer.

SUMMARY OF THE INVENTION

It is an objective of the present invention to provide an antenna-coupled microbolometer structure that enables achieving a low NEP figure and is easy to manufacture. Another objective of the present invention is to provide an advantageous method for manufacturing such an antenna-coupled microbolometer structure. A further objective of the present invention is to provide an advantageous method for using an antenna-coupled microbolometer for detecting electromagnetic radiation. A yet another objective of the invention is to provide a bolometric imaging arrangement.

The objectives concerning the microbolometer structure are met by producing an antenna-coupled microbolometer where the thermally sensitive element is a thin bridge of a conventional low-$T_c$ superconductor material, preferably niobium, suspended over a semiconductor substrate and separated therefrom by a vacuum gap. The objectives concerning the method for manufacturing a microbolometer structure are met by covering a semiconductor substrate with a sacrificial layer, patterning a top surface of said sacrificial layer with a conventional low-$T_c$ superconductor material, preferably niobium, and removing the sacrificial layer from beneath a thin bridge of said conventional low-$T_c$ superconductor material, thus leaving said bridge suspended over a semiconductor substrate and separated therefrom by an empty gap.

The objectives concerning the method for using an antenna-coupled microbolometer are met by using a microbolometer where the thermally sensitive element is a thin bridge of a conventional low-$T_c$ superconductor material, preferably niobium, suspended over a semiconductor substrate and separated therefrom by a vacuum gap, and biasing said bridge so that during operation a part of the middle of said bridge loses its superconductivity.

The objectives concerning the imaging arrangement are met by using antenna-coupled microbolometers of the described kind in an imaging arrangement.

A microbolometer structure according to the invention is characterized by the features recited in the characterizing part of the independent claim directed to a microbolometer structure.

A bolometric imaging arrangement according to the invention is characterized by the features recited in the characterizing part of the independent claim directed to such an arrangement.

A method for manufacturing a microbolometer structure according to the invention is characterized by the features recited in the characterizing part of the independent claim directed to such a method.

A method for using an antenna-coupled microbolometer for detecting electromagnetic radiation according to the invention is characterized by the features recited in the characterizing part of the independent claim directed to such a method.

Advantageous embodiments of the invention are described in the depending claims.

The so-called hotspot effect or hotspot mode is a phenomenon known as such. It means that a part, but only a part, of a superconductor loses its superconductivity and starts behaving like a normal ohmic conductor. Around the "hotspot" part the rest of the superconductor remains in a superconducting state. The hotspot effect has been used in hot-electron bolometer mixers, as is known from the publication D. Wilms Floet, E. Miedema, T. M. Klapwijk: "Hotspot mixing: A framework for heterodyne mixing in superconducting hot-electron bolometers", Applied Physics Letters, 74(3):433–435, 1999.

According to the invention, the hotspot effect is utilized in an antenna-coupled microbolometer so that a hotspot part emerges in the middle of the narrow bridge that constitutes the thermally sensitive element between two antenna branches. A constant bias voltage is the most advantageous way of biasing the antenna-coupled microbolometer in order to make the conditions favourable for the hotspot effect to appear. Voltage biasing has especially the advantageous effect of creating stabile bias conditions, i.e. a negative feedback situation: with a voltage bias the bias-related power dissipation within the ohmic conductor region is proportional to the squared bias voltage value divided by the resistance of the ohmic conductor region. In other words when the resistance of the ohmic conductor region increases, bias-related power dissipation decreases. If current biasing were used, the feedback would be positive: with a current bias the bias-related power dissipation within the ohmic conductor region is proportional to the squared bias current value times the resistance of the ohmic conductor region.

Using the hotspot effect in the way described above requires a very effective thermal isolation between the thermally sensitive element and the substrate that supports the antenna-coupled microbolometer. According to the invention the required grade of thermal isolation is achieved by using a so-called air-bridge as the thermally sensitive element. This means that a narrow neck or isthmus of the superconductor material that connects the antenna branches to each other is only supported at its ends, and spans over a gap where an empty space separates it from the substrate.

An advantageous way of producing an air-bridge involves using a so-called sacrificial layer on top of the actual substrate wafer. The sacrificial layer consists of a material that can be selectively removed for example in an etching process. A resist is distributed over the sacrificial layer and patterned, after which a layer of a superconductor material is produced onto the patterned, resist-covered workpiece. A lift-off process is used to remove excess resist, leaving just the desired superconductor patterns on top of the sacrificial layer. One part of the superconductor patterning is the narrow neck that is to constitute the air-bridge. The workpiece is then taken to an etching process, which eats out the sacrificial layer from uncovered areas and also produces an undercut at the edges of the superconductor patterns. The narrow neck is narrow enough to allow the undercut to reach all the way through the sacrificial material beneath it, leaving an empty space between the narrow neck of superconductor material and the substrate.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

DETAILED DESCRIPTION OF THE INVENTION

Figure 1:
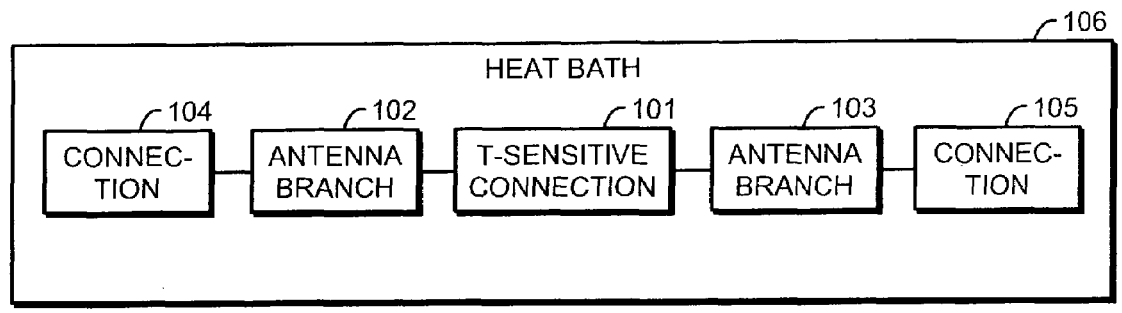
FIG. 1 illustrates schematically an antenna-coupled microbolometer with two antenna branches.

FIG. 1 illustrates the general structural principle of an antenna-coupled microbolometer with two antenna branches. A thermally sensitive element 101 connects the antenna branches 102 and 103 to each other. The thermally sensitive element 101 must be impedance-matched to the antenna branches 102 and 103 in order to avoid reflection losses at the interfaces between it and the antenna branches. Connections 104 and 105, which here are shown at the opposite ends of the antenna branches 102 and 103, complete the chain of elements, which is sunk in a heat bath 106 in order to keep it at a constant (or at least slowly varying) temperature. When the antenna-coupled microbolometer is subjected to electromagnetic radiation of suitable wavelength, a time-varying electric current is induced that flows between the antenna branches 102 and 103 through the thermally sensitive element 101. Assuming that the thermally sensitive element 101 has some electric resistance, an electric current flowing therethrough causes an increase in its temperature. By monitoring the changes of the local temperature of the thermally sensitive element 101 it is possible to deduce the intensity of electromagnetic radiation that hit the antenna-coupled microbolometer.

Figure 2:
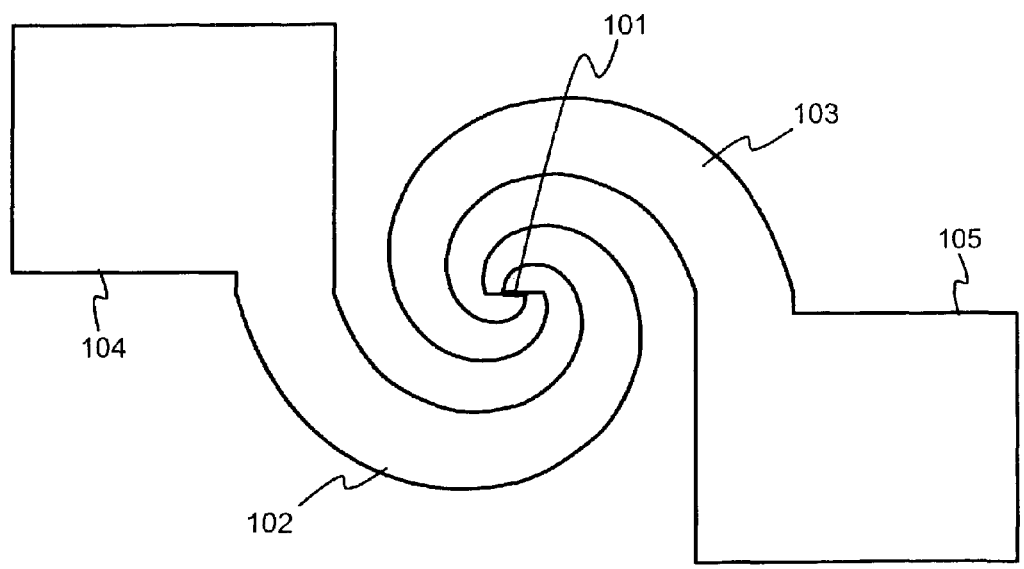
FIG. 2 illustrates an example of the physical appearance of the microbolometer components shown in FIG. 1.

FIG. 2 illustrates an example of the physical appearance of the elements 101, 102, 103, 104 and 105. The thermally sensitive element 101 is a narrow neck or isthmus that connects together the inner ends of the antenna branches 102 and 103, which are the opposite branches of a logarithmic spiral antenna. The outer ends of the antenna branches 102 and 103 continue as coupling pads 104 and 105 respectively for connecting the antenna to biasing and readout circuitry. The impedance matching between the narrow neck or isthmus 101 and the inner ends of the antenna branches 102 and 103 is achieved in a manner known as such by properly dimensioning the regions where each inwards spiralling antenna branch meets the corresponding end of the narrow neck or isthmus 101. The whole structure shown in FIG. 2 is made of a single, continuous sheet of a low-$T_c$ superconductor material, preferably niobium, onto a planar surface of a substrate that is not specifically shown in FIG. 2. It should be noted that a logarithmic spiral antenna is not the only choice for the basic form or type of the antenna; also other known bolometer antenna types such as a double-slot antenna or any other lithographically manufactured antenna could be employed. A logarithmic spiral antenna has the advantage of having a very wide operational frequency band and a real (non-complex) input impedance.

Everything in the antenna except the part of the thermally sensitive element where antenna currents are dissipated should be kept as lossless as possible. In the case of a single-layer Nb antenna this means that operational frequencies (the radiation frequencies to be detected) should remain below the gap frequency of Nb, which is in the order of 700 GHz. If higher frequencies are to be detected, an additional low resistivity metallization layer is needed, such as gold. As such, the subject of efficiently coupling electromagnetic radiation to lithographically manufactured microbolometer antennae is previously known and thus outside the scope of the present invention. It has been treated for example in the publications M. E. MacDonald, E. N. Grossman: "Niobium microbolometers for far-infrared detection", IEEE Transactions on Microwave Theory and Techniques, 43(4):893–896, April 1995; and E. N. Grossman, J. E. Sauvageau, D. G. McDonald: "Lithographic spiral antennas at short wavelengths", Applied Physics Letters, 59(25):3225–3227, December 1991.

The exemplary dimensions of the structure shown in FIG. 2 are such that the length and width of the narrow neck or isthmus 101 are 15 μm and 1 μm respectively, and the overall width across the double spiral pattern without the coupling pads 104 and 105 is in the order of 300 μm.

Figure 3:
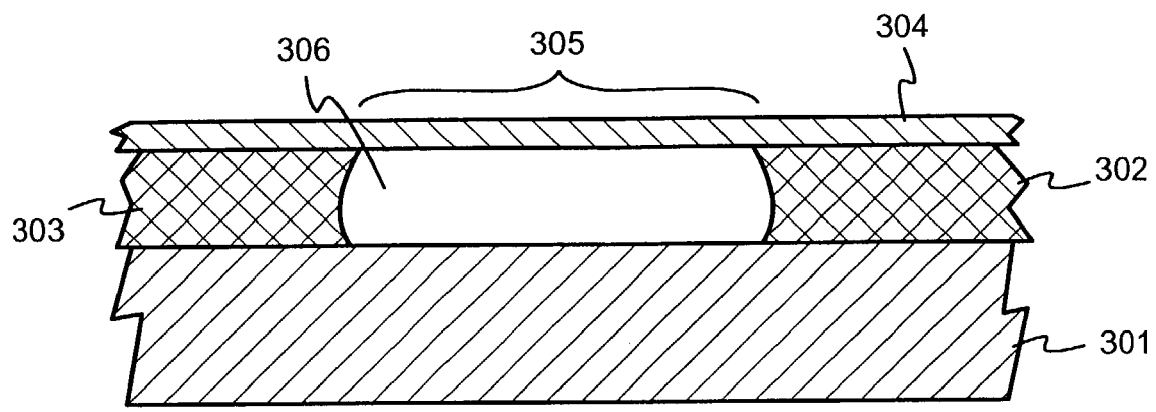
FIG. 3 illustrates the appearance of an empty gap between a thermally sensitive element and the substrate surface.

FIG. 3 is a partial cross-section through an antenna-coupled microbolometer structure like that of FIG. 2, showing the appearance of the central region. A substrate 301 acts as a support for the whole structure. The substrate 301 is typically a semiconductor wafer, for example a high-resistivity Si wafer. On one planar surface of the substrate 301 there is a sacrificial layer, of which parts 302 and 303 are shown in FIG. 3. These are the parts of the sacrificial layer which are directly beneath the inner ends of the antenna branches. The material of the sacrificial layer is something that is suitable for producing undercuts by etching. An example of the sacrificial layer material is $Si_3N_4$. On top of the sacrificial layer there is a layer 304 of a low-$T_c$ superconductor material, preferably niobium, from which patterns such as those shown in FIG. 2 have been produced. As a part of the patterning there is the narrow neck or isthmus 305. Between the narrow neck or isthmus 305 and the substrate 301 the sacrificial layer has been completely eaten away, leaving there a gap 306. The narrow neck or isthmus 305 thus constitutes an air-bridge. A typical height of the gap 306, i.e. the shortest separation between the substrate surface and the air-bridge, is in the order of 2 μm (micrometers).

Figure 4:
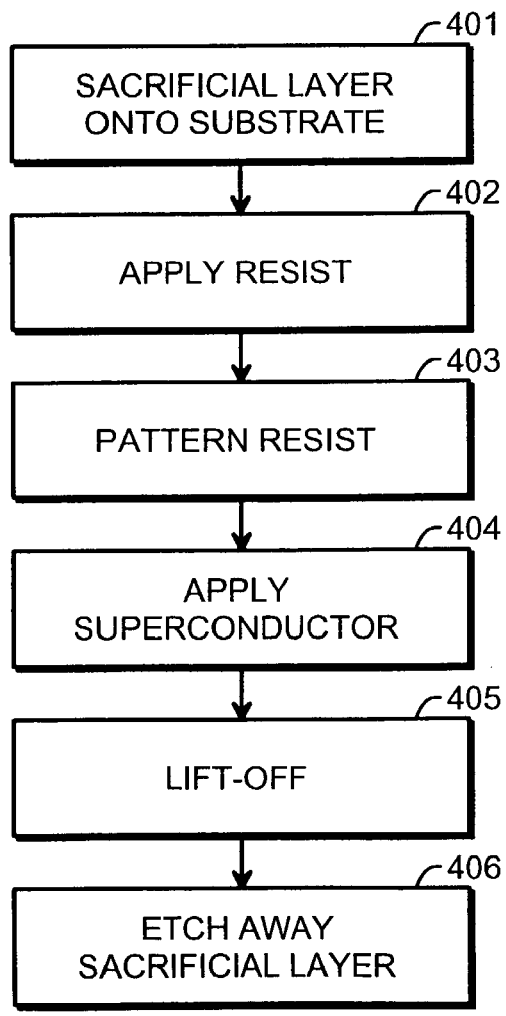
FIG. 4 illustrates schematically a method according to an embodiment of the invention.

FIG. 4 illustrates an advantageous process for manufacturing an antenna-coupled microbolometer structure according to the invention. The process starts at step 401 where a substrate is covered with a sacrificial layer. A typical substrate is a nitridized high-resistivity Si wafer, where the nitride has a nominal thickness of 1 μm and acts as the sacrificial layer. At step 402 the surface of the sacrificial layer is covered with a resist. The type of resist should be chosen according to the lithography method that is to be used. In this exemplary embodiment we use electron beam lithography, which means that for example a double layer PMMA-MAA/MAA electron resist can be used, where PMMA-MAA is a copolymer of methyl methacrylate and methacrylic acid, and MAA is methacrylic acid. Exemplary thicknesses of the resist layers are 350 nm (nanometers) for the bottom (PMMA-MAA) layer and 300 nm for the top (MAA) layer. If another lithography method like optical lithography was used, the resist(s) and resist layer thickness (es) should be selected accordingly.

At step 403 the resist is patterned in an electron beam process to obtain the patterns necessary for the antenna branches, the air-bridge and the heaters. After patterning, at step 404, a layer of low-$T_c$ superconductor material, preferably niobium, is deposited onto the patterned surface. Typical process parameters for Nb evaporation at an UHV (Ultra-High Vacuum) electron gun evaporator are a base pressure of $10^{-9}$ Torr and a rate of 3 Å/s. The thickness of the Nb layer is typically in the order of 100 nm. At the lift-off step 405 excess resist and the unwanted Nb remnants thereupon are washed away in a solvent, leaving only the required Nb patterns on top of the surface of the sacrificial layer.

The purpose of the etching step 406 is to etch away the sacrificial layer from uncovered areas as well as from beneath the neck or isthmus that connects the antenna branches to each other. In this exemplary process dry etching with a mixture of $CF_4$ and $O_2$ gases is suggested at a relatively high pressure of 50 mTorr, in order to achieve isotropic etching of the sacrificial layer. By prolonging the etching step it is possible to etch away even some of the substrate material if required, once the sacrificial layer has been completely eaten out on the exposed areas.

Figure 5:
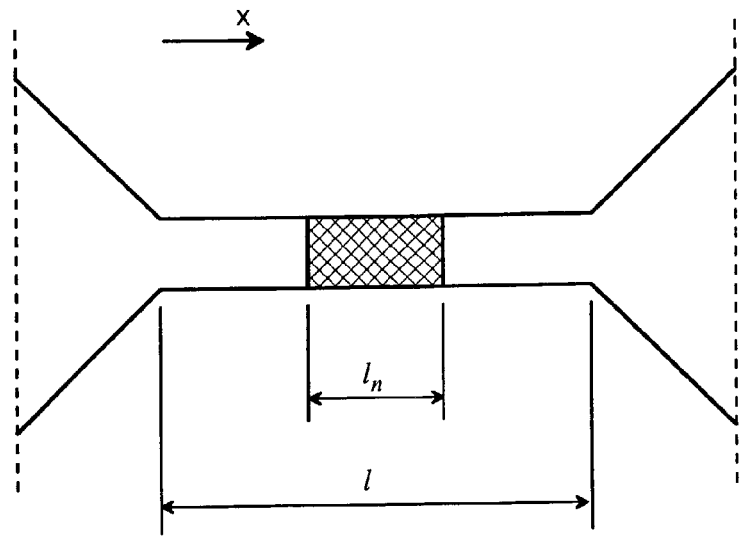
FIG. 5 illustrates certain concepts that are needed in a theoretical analysis of microbolometer performance.

We will now describe a theoretical model for the operation of an air-bridge of the above-described kind, a central part of which is in a normal ohmic conducting state while the ends of the air-bridge are in a superconducting state. FIG. 5 is a schematic illustration of such a situation. The whole length of the air-bridge is l, and symmetrically around the middle point thereof is a normal-state region the length of which is $l_n$. A reasonably good assumption is that heat flow only in the x-direction (the longitudinal direction of the air-bridge) needs to be considered. The equations that describe the heat flow through the air-bridge are $$-\kappa_N \frac{d^2 T}{dx^2} = \left(\frac{V}{\rho l_n}\right)^2 \rho + \frac{P_{opt}}{w t l_n} \quad (1)$$

$$-\kappa_S \frac{d^2 T}{dx^2} = 0 \quad (2)$$

where $\kappa_N$ is the thermal conductivity for material in the normal state,

T is temperature, x is dimension in the x-direction,

V is bias voltage across the air-bridge,

ρ is the resistivity of the material in the normal state, $l_n$ is the length of the normal-state region, $P_{opt}$ is optical power coupled to the antenna, w is the width of the air-bridge, t is time and $\kappa_S$ is the thermal conductivity for material in the superconducting state.

The normal-state region of the air-bridge is the only place where dissipation takes place, which holds both for dissipation of optical power and for ohmic dissipation due to the bias voltage. For this assumption to hold we must assume that the frequency of the incoming radiation is below the gap frequency of the superconductor material. Boundary conditions arise from the facts that at the ends of the air-bridge temperature must be equal to a constant (the temperature $T_0$ of the heat bath), and at the interfaces between the normal-state region and the superconducting regions surrounding it the first derivative of T in respect of x must be continuous. Additionally it is reasonable to assume that the local extreme value of T must occur at the middle of the normal-state region.

Under test conditions the antenna is in the dark, i.e. no optical power is involved. However, even in an optical measurement the optical power is in the order of tens of picowatts while the bias-related power is tens of nanowatts, i.e. the optical power is negligibly small. Mathematically $P_{opt}/wtl_n << V^2/\rho l_n^2$, so we may write a solution for a steady-state current I as a function of bias voltage V as $$I(V)_0 = \frac{4\kappa_S(T_c - T_0)wt}{Vl} + \frac{Vwt}{\rho l} \quad (3)$$

where $T_c$ is the critical temperature of the superconductor material, $T_0$ is the temperature of the heat bath and the other symbols are as in formulas (1) and (2). Here the second term on the right-hand side describes the ohmic behaviour of the resistive (normal-state) part of the air-bridge, and the first term gives the effect of the electro-thermal feedback. When the voltage V is small, the bias dissipation is constant and equal to $4\kappa_S(T_c-T_0)wt/l$.

Figure 6:
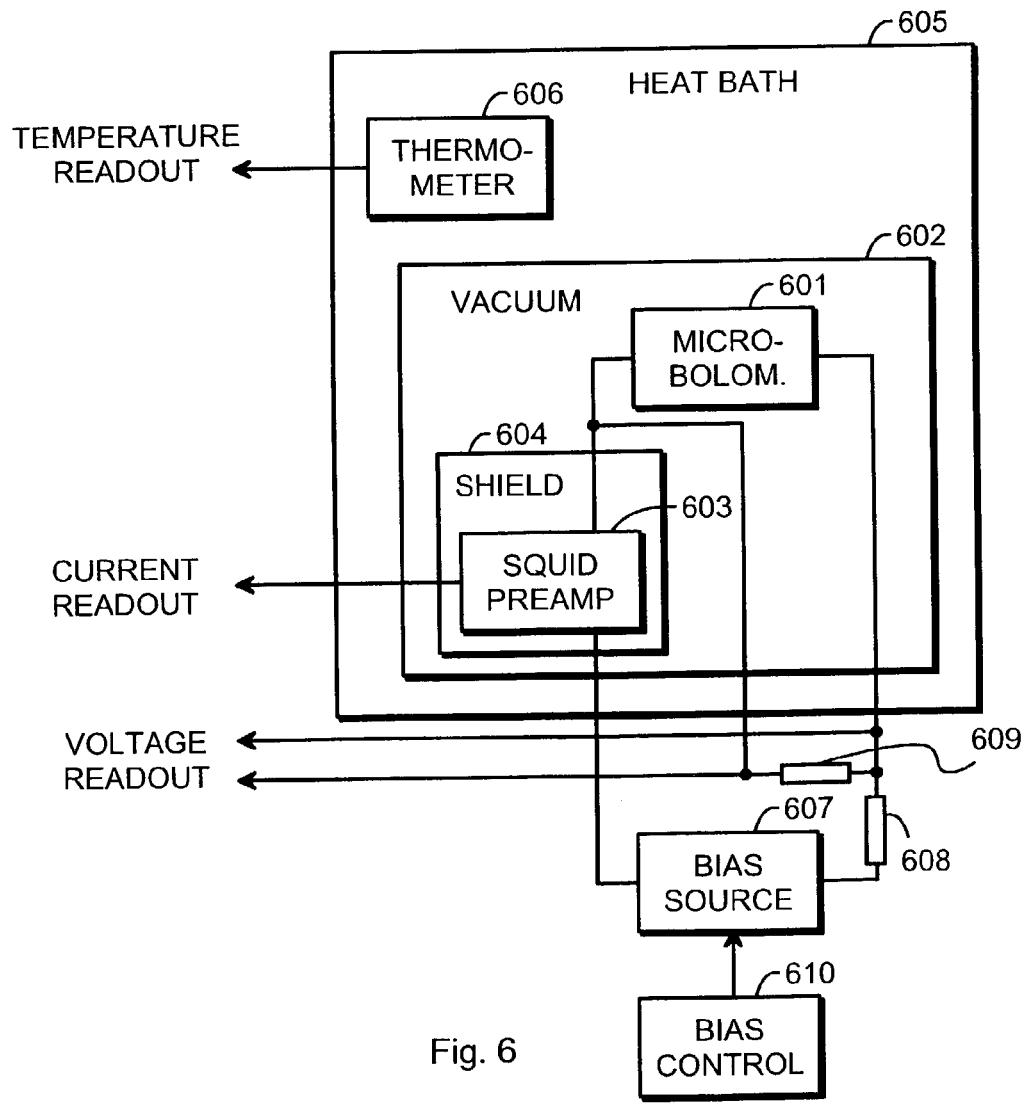
FIG. 6 illustrates a measurement connection that can be used to test an antenna-coupled microbolometer.

FIG. 6 illustrates a test measurement arrangement for measuring the current and voltage characteristics of an air-bridge that constitutes the thermally sensitive element in an antenna-coupled microbolometer according to the invention. The microbolometer 601 is placed into a vacuum container 602 together with a SQUID (Superconducting Quantum Interference Device) current preamplifier 603, which is additionally enclosed into a shield 604 made of superconductor material, such as niobium. The vacuum container 602 is immersed in liquid helium to provide a heat bath 605, the temperature of which can be monitored with a thermometer 606. A controllable bias voltage source 607, coupled in series with a current limiting resistor 608, is used to provide a bias voltage to the microbolometer 601 so that a shunt resistor 609 is connected in parallel with the microbolometer 601. A bias control unit 610 can tune the output voltage of the bias voltage source 607 so that desired bias voltage values across the microbolometer 601 are obtained. Tuning is ideally stepless, although a digitally controlled bias voltage can also be used if the tuning steps are small enough, in the order of microvolts. An exemplary resistance value both for the series resistor 608 and the shunt resistor 609 is 1.2 k$\Omega$, and an exemplary maximum output voltage of the bias voltage source 607 is 18 V.

During an exemplary test measurement the bias voltage is first set high enough so that the whole air-bridge in the microbolometer 601 is in normal state. The bias voltage is gradually decreased until there is seen a negative differential resistance, which signifies that a reduction in bias voltage has shortened the length of the normal-state region at the middle of the air-bridge. The bias voltage can be further lowered until the resistance of the air-bridge becomes comparable with the resistance of the shunt resistor 609. At this point the bias condition becomes unstable and approaches a current bias, and the whole air-bridge latches into superconducting state. Another measurement sweep can be performed after increasing the current through the air-bridge again high enough above the critical current so that the whole length of the air-bridge goes into the normal state again.

Measurements like that described above result in a number of current vs. voltage results. We may assume that all other parameters in equation (3) are constant and estimate the $\kappa_S$ and $\rho$ values by mathematically fitting the results into the curve defined by equation (3). A calculation was performed as a part of the development of the present invention, giving $\kappa_S$=1.44 W/Km, which is more than an order of magnitude smaller than that for niobium in normal state.

From a publication R. C. Jones: "The general theory of bolometer performance", J. Opt. Soc. Am., 43(1):1–14, 1953 it is known that for any resistive bolometer, the electrical responsivity can be calculated from the I–V curve using the differential Z=dV/dI and bias point resistance R=V/I. The parameter describing the negative electro-thermal feedback (ETF) in the bolometer is the loop gain, given by $\mathcal{L}=\beta(Z-R)/(Z+R)$. It can be calculated from equation (3), yielding $\mathcal{L}=4\beta\kappa_S\rho(T_c-T_0)/V^2$. Here $\beta=(R-R_s)/(R+R_s)$ describes the influence of the voltage source impedance on the ETF. The loop gain depends actually on frequency, but this dependency can be neglected if we assume that the device response is much faster than any typical signal. In the context of the present invention we have assumed that the thermal time constant of the antenna-coupled microbolometer is in the order of one microsecond, which is fast enough if the signal to be detected is within the range of audio frequencies. A general treatment of a voltage biased bolometer yields a result for the current responsivity $S_I$ $$S_I \equiv \frac{dI}{dP} = -\frac{1}{V}\frac{\mathcal{L}}{\mathcal{L}+1} \quad (4)$$

which approaches a value $-1/V$ when $\mathcal{L}$ is large.

Figure 7:
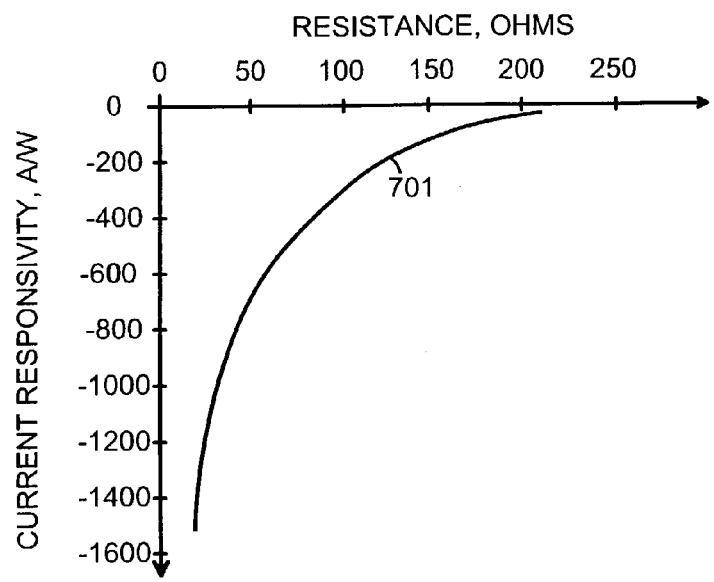
FIG. 7 illustrates a plot of current responsivity versus air-bridge resistance in an antenna-coupled microbolometer according to an embodiment of the invention and FIG. 8 illustrates a bolometric imaging arrangement according to an embodiment of the invention.

FIG. 7 is an approximated graphical representation of the current responsivity of an antenna-coupled microbolometer according to an embodiment of the present invention as a function of the resistance of the air-bridge. The curve 701 has been calculated from the fit between the measurement I–V characteristics and equation (3). The most interesting region is that there the bias resistance of the air-bridge can be matched directly to a lithographic antenna. For example at bias resistance value 75 $\Omega$ the air-bridge is perfectly matched to the impedance of a logarithmic spiral antenna on Si, and the current responsivity is about –450 A/W. A double-slot antenna is known to have an even lower impedance, so using such an antenna instead of the logarithmic spiral onewould allow obtaining an even larger absolute value of current responsivity.

The measurement coupling shown in FIG. 6 can be used to investigate the noise characteristics of the combination of an antenna-coupled microbolometer and a SQUID current preamplifier according to an embodiment of the invention. The output of the SQUID current preamplifier 603 is then coupled to a spectrum analyzer and the microbolometer 601 is biased consecutively at different points on the I–V curve. In such an arrangement the spectrum analyzer receives a combination of uncorrelated contributions from the random fluctuations of heat exchanged between the normal-state region of the air-bridge and the heat sink, Johnson noise of the resistive part, and noise from the SQUID. The first of these is the phonon noise current, which according to a publication J. C. Mather: "Bolometer noise: non-equilibrium theory", Applied Optics, 21(6):1125–1129, March 1982 is given by $$i_p = \sqrt{\gamma 4 k_B T_c^2 G} \, |S_I| \qquad (5)$$

where $\gamma=0.46$ describes the effect of the temperature gradient in the bridge to the phonon noise and G is the thermal conductance between the air-bridge and the heat bath, expressed in watts per kelvin. Taking into account the ETF, the Johnson noise current is given by $$i_j = \sqrt{\frac{4 k_B T_c}{R} \frac{(1+\beta)}{2(1+\mathcal{L})}} \qquad (6)$$

The SQUID has a current noise $i_n$, which is known from the specifications of the SQUID and almost constant throughout the interesting region of the I–V curve that represents air-bridge resistance values below 100Ω. The squared total NEP of the whole combination is given by $$NEP_{tot}^2 = i_p^2 + \frac{i_j^2}{|S_I|^2} + \frac{i_n^2}{|S_I|^2} \qquad (7)$$

Equations (5), (6) and (7) as well as the measured or estimated current noise of the SQUID can be used to compose a theoretical prediction of the noise characteristics.

A practical measurement was performed as a part of the development work of the present invention, monitoring the noise spectral density at 10 kHz, which is well below the knee of the estimated thermal cut-off frequency of 1 MHz. Some exemplary total NEP values from the practical measurement are presented in Table 1.

TABLE 1

| Resistance of air-bridge, Ω | NEP, fW/$\sqrt{Hz}$ |
| --- | --- |
| 55 | 34 |
| 60 | 30 |
| 68 | 25 |
| 70 | 23 |
| 75 | 21 |
| 95 | 30 |

The total NEP values obtained from practical measurements are otherwise in line with said theoretical prediction, but with very small bias voltage values below 0.9 mV, where the resistance of the air-bridge is less than about 25 Ω the measured values are some tens of per cent greater than predicted. All in all the measured NEP values remain at a level of some fiftieth part of those typical to prior art antenna-coupled microbolometers known to the inventor. Better noise matching with the SQUID readout could lower the NEP even further. The geometry of the air-bridge and its connection to the antenna could also be optimised to reduce the geometrical inductance of the device and to improve the thermal isolation even further.

Figure 8:
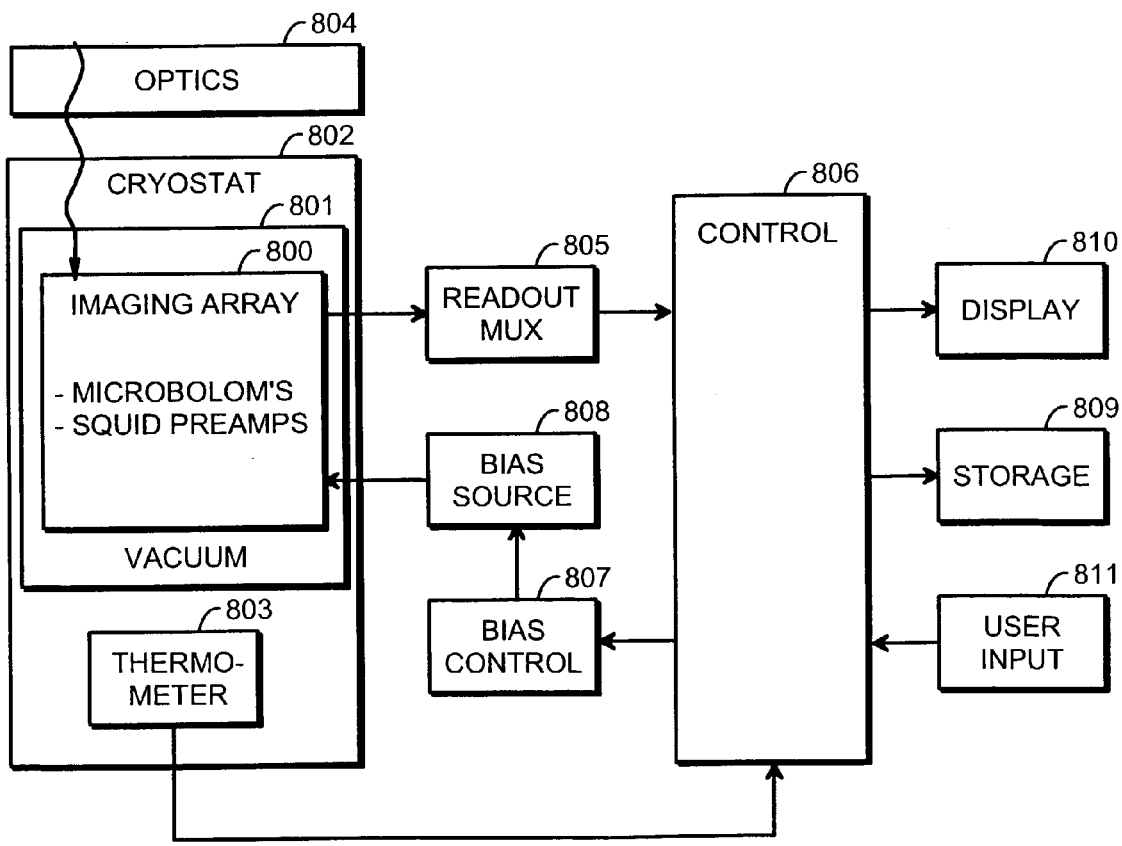

FIG. 8 illustrates an imaging arrangement according to an embodiment of the invention. The most important element for the purpose of detecting electromagnetic radiation and converting it into an image is an imaging array 800, which comprises a multitude of antenna-coupled microbolometers and their associated SQUID current preamplifiers. Each microbolometer-preamplifier pair constitutes a pixel in the imaging array 800. In order to achieve vacuum isolation of the air-bridges of the antenna-coupled microbolometers, the imaging array 800 comprises a vacuum container 801 for supporting a vacuum environment around the antenna-coupled microbolometers. Additionally in order to achieve superconductivity, the imaging array 800 is enclosed in a cryostat 802 that is arranged to keep the imaging array 800 at a suitably low constant temperature, like 4.2 K. The temperature is most advantageously continuously monitored with a thermometer 803. The imaging arrangement comprises also an quasioptical system 804 for conducting electromagnetic radiation from an object to be examined onto the imaging array 800.

The exact pressure value inside the vacuum container 801 is not of utmost importance, because the main reason for using a vacuum around the antenna-coupled microbolometers is just the aim of achieving good thermal isolation. The better the vacuum, the better the thermal isolation and thus the lower the phonon noise current. Cooling the imaging array to the level of 4.2 K actually serves to provide a relatively good vacuum, because at 4.2 K all other gases than helium have been frozen onto the inner walls of the vacuum container and only helium can appear in gaseous form. The vacuum container can be made tight enough relatively easily by using conventional practices.

Regarding the quasioptical system 804 it should be noted that antenna-coupled microbolometers are frequently coupled to the incoming radiation through the substrate, because the fact that the antenna resides on a substrate having a high dielectric constant (such as Si) causes the directivity pattern of the antenna to be heavily directed into the substrate. The resistivity of the substrate must be high in order to minimize absorption within the substrate. The quasioptical lens is thus typically placed at the substrate-air (or substrate-vacuum) interface on the opposite side of the substrate. This prevents the generation of the so-called substrate modes. It would be at least theoretically possible to manufacture the antenna and the bolometer onto a self-supporting nitride window, which would be obtained through anisotropic etching of nitridized silicon, and to place a suitable reflector or waveguide element behind the window. The window material itself could be etched away from areas where no metallizations exist, leaving a self-supporting antenna—air-bridge combination. However, it is unfortunately very probable that excessive tension would snap the air-bridge at the step of etching away the nitride.

The outputs of the SQUID current preamplifiers are coupled to a readout multiplexing arrangement 805 that is capable of reading an output signal (a current measurement value) from each preamplifier separately and of conducting the readings so obtained into a general control unit 806. Some parts of the readout multiplexing arrangement 805 can even be located within the cryostat 802, especially if such parts have been integrated into a common structural entity with the imaging array 800. The control unit 806 also provides control commands to a bias voltage control unit

807, which is arranged to drive a tunable bias voltage source 808 that generates the tunable bias voltage that is the same for all antenna-coupled microbolometers in the imaging array 800. There is also a coupling from an output of the thermometer 803 to the control unit 806 for providing the latter with up-to-date information about the present temperature within the cryostat 802.

The control unit 806 is arranged to collect the measurement value readings that it obtains through the readout multiplexing arrangement 805 and to arrange this information into digital images, which it can store into storing means 809 and/or display on displaying means 810. A user can control the operation of the control unit 806 through a user input interface 811 coupled thereto.

It is very advantageous to use SQUID current preamplifiers (or more generally: low-noise preamplifiers that utilize superconductivity in their operation) in an imaging arrangement according to the invention, for multiple reasons. Firstly, it is relatively straightforward to integrate such preamplifiers into a common structure with the antenna-coupled microbolometers either by manufacturing them directly onto the same semiconductor substrate with the microbolometers or by bonding suitable, separately manufactured preamplifier chips onto such a semiconductor substrate. Secondly, as a consequence of that above, it is possible to accurately match the characteristics of the microbolometers and amplifiers together in order to minimize noise and losses. Thirdly, low-noise preamplifiers that utilize superconductivity in their operation dissipate very little power by themselves, which means that they are unlikely to cause problems related to any excessive heat generation within the cryostat.

When the bias voltage for each antenna-coupled microbolometer within the imaging array is the same, the current readings from the SQUID current preamplifiers directly reveal the image data values, i.e. the relative intensities of radiation detected at different pixels. The control unit typically comprises automatic bias voltage adaptation routines that dynamically tune the bias voltage value so that the dynamic range of the imaging array is utilized most efficiently in respect of momentary overall intensity of radiation to be detected.

The ultimate lower limit for the number of pixels (i.e. the number of microbolometer—preamplifier pairs) is one, in which case the imaging arrangement is merely a simple radiation intensity detector that can only be used for imaging if it comprises means for selecting and changing the direction from which radiation is received. There is no theoretical upper limit for the number of pixels, but in practice an upper limit comes from the fact that semiconductor wafers only come in certain sizes and each microbolometer—preamplifier pair reserves a certain finite space on the surface of the semiconductor wafer.

The specific embodiments of the invention that have been discussed above should not be construed as placing limitations to the applicability of the appended claims. For example, even if only a lift-off process was described above as means for pattering a substrate, it is clear to the person skilled in the art that also suitable wet etching can be used. Likewise it is possible to vary the relations between the antenna-coupled microbolometers and the associated SQUID preamplifiers: above it was assumed that each microbolometer has its own SQUID preamplifier and the outputs of the SQUID preamplifiers are multiplexed, but also an alternative approach can be taken where several antenna-coupled microbolometers are multiplexed to use a single SQUID preamplifier. Multiplexing of the last-mentioned kind can be achieved for example through the use of suitable thermal switches.

The invention claimed is:

1. A bolometric imaging arrangement, comprising:
   an antenna-coupled microbolometer, comprising a substrate, an antenna supported by the substrate and a thermally sensitive element connected to the antenna and arranged to dissipate electric currents induced into the antenna, of which both the antenna and the thermally sensitive element comprise material that is susceptible to achieving a superconductive state below a certain critical temperature;
   wherein the thermally sensitive element is supported at a distance from the substrate leaving an empty gap between the thermally sensitive element and a surface of the substrate, and wherein the bolometric imaging arrangement comprises a vacuum container for enclosing the antenna-coupled microbolometer in a vacuum environment and a cryostat for keeping the antenna-coupled microbolometer under the critical temperature, and wherein the bolometric imaging arrangement comprises biasing means adapted to bias the thermally sensitive element into a state in which a part of its length, less than its total length, is in a normal ohmic conducting state.

2. A bolometric imaging arrangement according to claim 1, additionally comprising a SQUID current preamplifier coupled to the antenna-coupled microbolometer for measuring electric currents that flow through the antenna and the thermally sensitive element.

3. A bolometric imaging arrangement according to claim 2, comprising:
   an imaging array with a multitude of mutually associated antenna-coupled microbolometer and SQUID current preamplifier pairs, so that each antenna-coupled microbolometer and SQUID current preamplifier pair within the imaging array constitutes a pixel for producing a data value representative of an intensity of electromagnetic radiation detected at the location of the pixel,
   readout multiplexing means for selectively reading data values from pixels in the imaging array, and
   control means for converting read data values into images that represent the distribution of detected electromagnetic radiation across the imaging array.

4. A bolometric imaging arrangement according to claim 2, comprising:
   an imaging array with a multitude of antenna-coupled microbolometers, so that each antenna-coupled microbolometer within the imaging array constitutes a pixel for producing a data value representative of an intensity of electromagnetic radiation detected at the location of the pixel,
   within the imaging array a SQUID current preamplifier and
   multiplexing means for selectively coupling outputs from pixels in the imaging array into the SQUID current preamplifier,
   readout means for selectively reading data values from pixels in the imaging array through the SQUID preamplifier, and
   control means for converting read data values into images that represent the distribution of detected electromagnetic radiation across the imaging array.

5. A method for detecting electromagnetic radiation with an antenna-coupled microbolometer that comprises a substrate, an antenna and a thermally sensitive element connected to the antenna and arranged to dissipate electric currents induced into the antenna, of which both the antenna and the thermally sensitive element comprise material that is susceptible to achieving a superconductive state below a certain critical temperature, and the thermally sensitive element is supported at a distance from the substrate leaving an empty gap between the thermally sensitive element and a surface of the substrate, the method comprising the steps of:

enclosing the antenna-coupled microbolometer in a vacuum environment and keeping the antenna-coupled bolometer under the critical temperature, biasing the antenna-coupled microbolometer with a bias voltage, detecting an amount of electric current that flows through the antenna-coupled microbolometer and deducing which part of the detected amount of electric current was due to electromagnetic radiation received by the antenna;

wherein the step of biasing the antenna-coupled microbolometer comprises selecting the bias voltage so that the bias-induced electric current through the antenna-coupled microbolometer and received radiation induced electric current through the antenna-coupled microbolometer together heat the thermally sensitive element enough to cause a part of its length, less than its total length, to remain in normal ohmic conducting state.

* * * * *